(12) United States Patent
Aharoni et al.

(10) Patent No.: US 8,910,281 B1
(45) Date of Patent: Dec. 9, 2014

(54) IDENTIFYING MALWARE SOURCES USING PHISHING KIT TEMPLATES

(75) Inventors: Idan Aharoni, Tel Aviv (IL); Roy Hodgman, Wenham, MA (US)

(73) Assignee: EMC Corporation, Hopkinton, MA (US)

( * ) Notice: Subject to any disclaimer, the term of this patent is extended or adjusted under 35 U.S.C. 154(b) by 158 days.

(21) Appl. No.: 13/537,251

(22) Filed: Jun. 29, 2012

(51) Int. Cl.
 *H04L 29/06* (2006.01)
(52) U.S. Cl.
 CPC .................................. *H04L 63/1416* (2013.01)
 USPC .......................................................... 726/22
(58) Field of Classification Search
 None
 See application file for complete search history.

(56) References Cited

U.S. PATENT DOCUMENTS

| 8,370,942 B1 | 2/2013 | Peterson et al. | |
| 2007/0094500 A1* | 4/2007 | Shannon et al. | 713/170 |
| 2008/0276315 A1* | 11/2008 | Shuster | 726/22 |

* cited by examiner

*Primary Examiner* — David Pearson
(74) *Attorney, Agent, or Firm* — BainwoodHuang

(57) ABSTRACT

An improved technique involves searching for emails having a particular template generated by a phishing kit. Such a template typically includes field names corresponding to credentials that a customer inputs into a spoofed web site as part of a phishing attack. The phishing kit used in a phishing attack is typically configured to construct an email so that it arranges the credentials in a regular, tabular fashion. Accordingly, an administrator configures a receiver to search an email server for emails having a sequence of keywords in a format that matches the particular template.

21 Claims, 5 Drawing Sheets

╱ 90

Obtaining a phishing kit that is constructed and arranged to i) generate emails in response to phishing victims entering confidential personal data into a form in a web page, and ii) send the emails to destination addresses, the emails including the confidential personal data arranged in a particular format
92

Finding an email in an email server on the network, the email including other confidential personal data arranged in the particular format
94

Ascertaining a destination address from the email, the destination address identifying a malicious user
96    that has perpetrated a phishing attack

| | |
|---|---|
| malicious.fraudster@hotmail.com | |
| | |
| ----------bymaliciousFraudster--------------- | |
| First Name: | Legitimate |
| Last Name: | User |
| Account #: | xxxxxxxx |
| Routing Code: | xxxxxxxxx |
| Credit Card #: | xxxx-xxxx-xxxx-xxxx |
| Expiration Date: | xx/xx/xxxx |
| Security Code: | xxx |
| ----------bymaliciousFraudster--------------- | |

IDENTIFYING MALWARE SOURCES USING PHISHING KIT TEMPLATES

BACKGROUND

Some users of computers connected to the Internet experience various attacks from attackers hoping to steal sensitive information. In a particular type of attack known as a phishing attack, a customer on a computer is lured into divulging credentials to an attacker through a spoofed web site that the customer believes is authentic. For example, suppose that the customer performs online banking transactions with his bank, Customer Bank. The attacker, who may only be guessing that the customer has an account with Customer Bank, sends the customer an email directing the customer to click on a link. The customer, thinking that the email is from Customer Bank and is legitimate, clicks on the link and is taken to a site controlled by the attacker which looks very similar or identical the legitimate website operated by Customer Bank. On the attacker's site, the customer inputs credentials such as an account number and a password into a form. After the customer enters the credentials, scripting code from which the website runs sends the credentials to the intruder in an email.

Intruders that conduct phishing attacks typically derive the spoofed web sites, as well as the scripting code that sends credentials to the intruder, from phishing kits available in underground hacking channels. Such phishing kits provide an attacker with tools that make deploying spoofed websites simple; previously, the intruder manually copied information from a web site and constructed HTML code from the information. The phishing kits typically include PHP script files for providing the spoofed website as well as commands for sending customer-entered credentials to the intruder in a credentials email. The phishing kits may also include a set of images or other visual elements for display on the spoofed web site for additional realism.

In halting such phishing attacks, conventional network security techniques involve extracting, from a phishing kit, a destination email address belonging to an intruder. Once such a destination email address has been extracted the email provider used by the intruder can be contacted to have the destination email address shut down.

SUMMARY

Unfortunately, there are deficiencies with the above-described conventional network security techniques. For example, in extracting a destination email address, a security analyst is only addressing a single phishing attack. Typically, a phishing kit may be associated with dozens, if not hundreds, of intruders perpetrating phishing attacks. As each intruder has a different email address, a large effort is needed to contain the potential damage from a single phishing kit.

It should be understood that the email that a phishing kit is configured to send to the intruder is typically organized in a particular fashion so as to present the acquired credentials in a simple format. For example, an email generated by the phishing kit may contain a credit card account number, an expiration date, and a 3-digit security code in a tabular format. These values are each typically preceded by corresponding labels, e.g., "CC#:", "Exp. Date:", and "Security Code:", respectively. In many cases, the Phishing kit creators also leave a unique signature in the generated email along with the credentials, in order to advertise their service.

In contrast to conventional security methods in which obtaining a phishing kit only addresses a single phishing attack, an improved technique involves searching for emails having a particular template generated by a phishing kit. Such a template typically includes field names corresponding to credentials that a customer inputs into a spoofed web site as part of a phishing attack, as well as the signature added by the phishing kit creator, if one exists. The phishing kit used in a phishing attack is typically configured to construct an email so that it arranges the credentials in a regular, tabular fashion. Accordingly, an administrator configures a receiver to search an email server for emails having a sequence of keywords in a format that matches the particular template.

Advantageously, the improved technique allows for the identification of many, if not all, of the intruders using a particular phishing kit. Because the format of the email generated by a phishing kit provides a signature of the phishing kit, an email provider may identify an incoming email having this format as an email associated with a particular phishing attack. Further, the email provider may take further action against the intruders to which credentials emails are addressed. For example, the administrator may notify the email providers of all potential recipients of credentials emails so that their accounts may be terminated.

One embodiment of the improved technique is directed to a method of identifying malicious users that perpetrate phishing attacks on a network. The method includes obtaining a phishing kit that is constructed and arranged to i) generate emails in response to phishing victims entering confidential personal data into a form in a web page, and ii) send the emails to destination addresses, the emails including the confidential personal data arranged in a particular format. The method also includes placing the sequence of keywords into a template file in the particular format. The method further includes finding an email in an email server operated by an email service provider, the email including other confidential personal data arranged in the particular format. The method further includes ascertaining a destination address from the email, the destination address identifying a malicious user that has perpetrated a phishing attack.

Additionally, some embodiments of the improved technique are directed to a system constructed and arranged to identify malicious users that perpetrate phishing attacks on a network. The system includes a network interface, a memory, and a processor coupled to the memory, the processor configured to carry the method of identifying malicious users that perpetrate phishing attacks on a network.

Furthermore, some embodiments of the improved technique are directed to a computer program product having a non-transitory computer readable storage medium which stores code including a set of instructions to carry the method of identifying malicious users that perpetrate phishing attacks on a network.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

FIG. 4 is a schematic diagram illustrating an example dataset derived from an email sent from a computer within the electronic environment shown in FIG. 1.

DETAILED DESCRIPTION

An improved technique involves searching for emails having a particular template generated by a phishing kit. Such a template typically includes field names corresponding to credentials that a customer inputs into a spoofed web site as part of a phishing attack, as well as a possible signature added by the phishing kit creator. The phishing kit used in a phishing attack is typically configured to construct an email so that it arranges the credentials in a regular, tabular fashion. Accordingly, an administrator configures a receiver to search an email server for emails having a sequence of keywords in a format that matches the particular template.

Advantageously, the improved technique allows for the identification of many, if not all, of the intruders using a particular phishing kit. Because the format of the email generated by a phishing kit provides a signature of the phishing kit, an administrator of an email provider may identify an email having this format as an email associated with a particular phishing attack. Further, the administrator may take further action against the intruders to which credentials emails are addressed.

Figure 1:
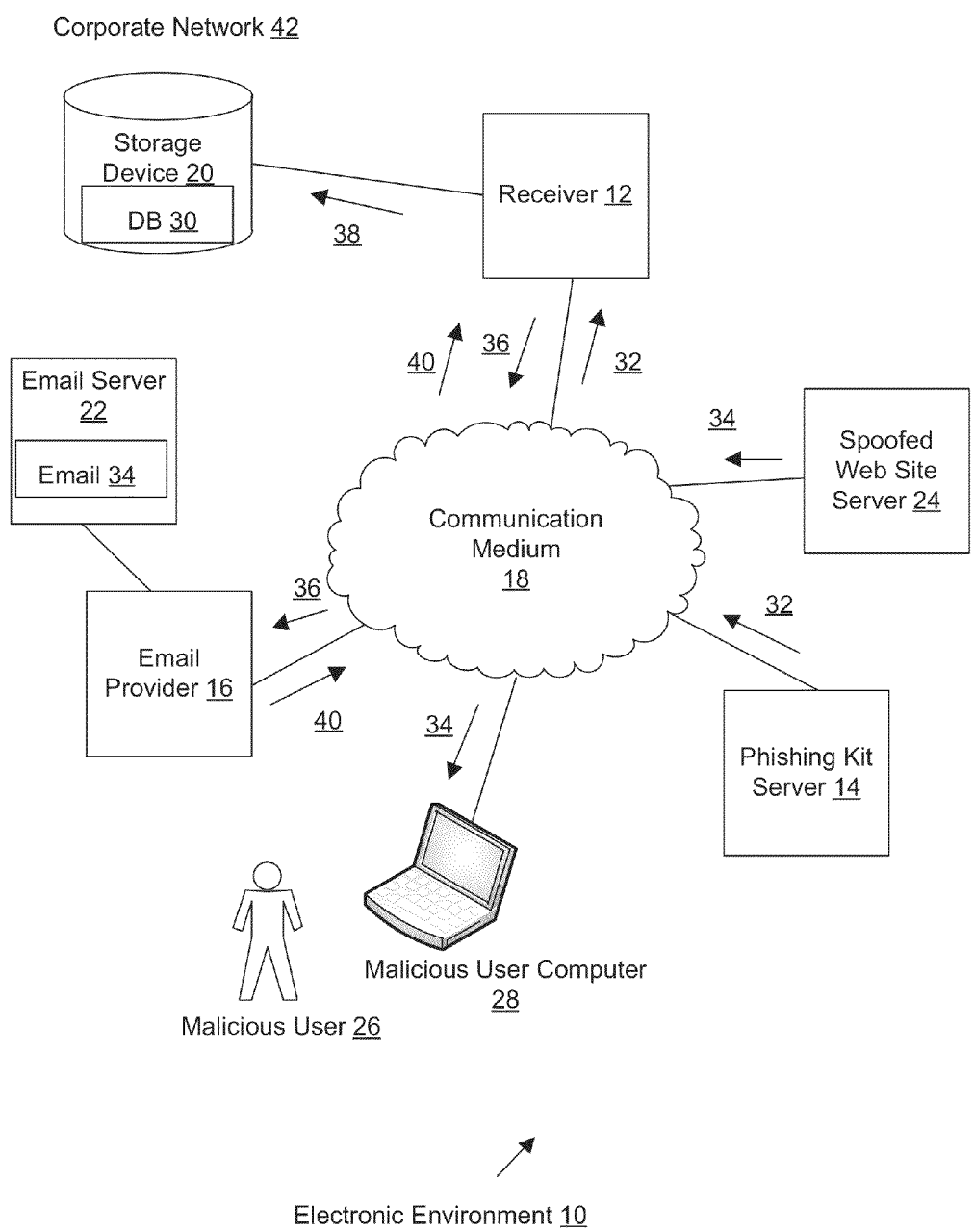
FIG. 1 is a block diagram illustrating an electronic environment for carrying out the improved technique.

FIG. 1 illustrates an example electronic environment 10 for carrying out the improved technique. Electronic environment 10 includes receiver 12, phishing kit server 14, email provider 16, communication medium 18, storage device 20, spoofed web site server 24, and malicious user computer 28.

Communication medium 18 provides network connections between receiver 12, phishing kit server 14, email provider 16, spoofed web site server 24, and malicious user computer 28. Communications medium 18 may implement a variety of protocols such as TCP/IP, UDP, ATM, Ethernet, Fibre Channel, combinations thereof, and the like. Furthermore, communications media 18 may include various components (e.g., cables, switches/routers, gateways/bridges, NAS/SAN appliances/nodes, interfaces, etc.). Moreover, the communications medium 18 is capable of having a variety of topologies (e.g., queue manager-and-spoke, ring, backbone, multi drop, point to-point, irregular, combinations thereof, and so on).

Receiver 12 is constructed and arranged to obtain, from phishing kit server 14, a phishing kit that has code including a particular sequence of keywords and instructions to lay out the sequence of keywords in a particular format in an email. Receiver 12 is also constructed and arranged to identify emails that include the sequence of keywords in the particular format. Receiver 12 takes the form of a server as part of an anti-fraud operation; in some arrangements, receiver 12 is a personal computer, laptop computer, or tablet computer. Further details of receiver 12 will be described below with respect to FIG. 2.

Phishing kit server 14 is constructed and arranged to provide malicious user 26 with access to a phishing kit 32.

Phishing kit 32 is configured to generate spoofed web sites from a malicious communication 34 sent from malicious user computer 28. Phishing kit 32 includes PHP scripts for generating a spoofed web site and generating a credential email message 36 that contains credentials such as personally identifiable information (PII) to be sent to malicious user 28. In some arrangements, phishing kit 32 includes a set of images that are posted to spoofed web site server 24 for added realism.

Email provider 16 is configured to provide email services to users such as malicious user 16 via email server 22. Email provider 16 takes the form of an Internet-based email service (e.g., Gmail, Yahoo!®, etc.). In some arrangements, however, email provider 16 is a local internet service provider.

Email server 22 is configured to provide storage for incoming and outgoing emails belonging to various account holders, including malicious user 26. Email server 22 is further configured to provide filtering services to incoming emails, e.g., spam filtering, IP filtering, MAC address filtering.

Credentials email 34 is an email generated from PHP code in spoofed site, with data taken from credentials input into spoofed web site server 24.

Storage device 20 is configured to store information taken from credentials email 34 in database 30.

Spoofed web site server 24 is configured to host a web site used in a phishing attack.

Malicious user computer 28 belongs to malicious user 26 and is configured to receive credentials email 34 from spoofed web site server 24. Malicious user computer 28 is a laptop computer; in some arrangements, malicious user computer 28 is a desktop computer, a tablet computer, a personal digital assistant, or a smartphone.

During operation, receiver 12 acquires phishing kit 32 from phishing kit server 14. For example, an administrator locates phishing kit 32 via receiver 12 as part of an investigation of suspected underground phishing channels. Receiver 12 identifies files on phishing kit server 14 as phishing kit 32 by recognizing PHP files in the phishing kit as being configured to generate a spoofed web site. The acquisition of phishing kit 32 is performed with stealth so that actual intruders such as malicious user 26 that belong to an underground phishing channel would not suspect that phishing kit 32 will be compromised.

It should be understood that phishing kit 32 can be obtained from phishing server 24 if the malicious user 26 left phishing kit 32 on phishing server 24 after, e.g., unzipping phishing kit 32.

Upon obtaining phishing kit 32, receiver 12 identifies a formatting structure of emails that the PHP script of phishing kit 32 is configured to send from spoofed web site server 24. For example, receiver 12 identifies field headers indicating that credit card information is intended to be obtained from customer 14. Such field headers include "CC #:", "Exp. Date:", and "Security Code #:". Further details of a possible template for email 34 that contain credentials of a victim of a phishing attack are described below with respect to FIG. 3 and FIG. 4.

It should be understood that the field headers in credentials email 36 serve to identify email 34 as originating from phishing kit 32. While information such as credit card data is mostly sent legitimately, only through phishing kit 32 does such data get sent via email 34 in a particular format.

Receiver 12 extracts these field headers from the PHP script of phishing kit 32 and places them in a file 36. It should be understood that the extracted field headers form a sequence of keywords when stored in template file 36. That is, receiver 12 stores the extracted field names in the order in which they appear in template file 36. Further, receiver 12 stores formatting information in template file 36 with respect to the sequence of keywords, e.g., tabs, carriage returns, etc.

In some arrangements, receiver 12 also extracts images from image files in phishing kit 32 and stores them in template file 36. In some arrangements, receiver 12 stores the images on storage device 20 and places pointers to the images in template file 36.

Receiver 12 sends template file 36 to email provider 16. In some arrangements, receiver 12 embeds template file 36 within a message describing potential phishing attacks using phishing kit 32.

Email provider 16 performs a search operation on email server 22 for emails that contain the sequence of keywords and the formatting information from template file 36. The search operation takes the form of standard searches for content in files within a directory.

At some point in time, malicious user 26, who has an email account with email provider 16, had sent a malicious communication to a phishing victim via communication medium 22 as part of a phishing attack. For example, the malicious communication contains a request for the phishing victim to verify account details by clicking a link to a web site displayed on the victim's computer that appears to belong to a credit card provider. The victim clicks the link and follows instructions on the web site to input credentials such as card number, expiration date, and security code. Upon submission, the PHP script in phishing kit 32 generates email 34 containing the field names and corresponding field values in the form of the information submitted by the victim.

Because malicious user 26 used phishing kit 32 to generate email 34, the search operation produces email 34 stored on email server 22. That is, email provider 16 identifies email 34 as having been used in a phishing attack that used phishing kit 32.

Email provider 16 takes action to identify malicious user 26. In some arrangements, email provider 16 extracts the content 40 from the header of email 34 and sends content 40 to receiver 12. From content 40, receiver 12 extracts information concerning malicious user 26, e.g., email address, device identifier of malicious computer 28, etc.

In some arrangements, email provider 16 will shut down the email account belonging to malicious user 26 after the search operation produces email 34. In other arrangements the provider will continue to monitor traffic to that account.

In some arrangements, email provider 16 also send field values 38 (i.e., credentials information input into the spoofed web site) corresponding to field headers in email 34 to receiver 12. Receiver 12 then stores field values 38 in database 30. An administrator operating receiver 12 may then notify a credit card company (referencing the example above) that an account belonging to the phishing victim has been compromised.

Further details of receiver 12 will be described below with respect to FIG. 2.

Figure 2:
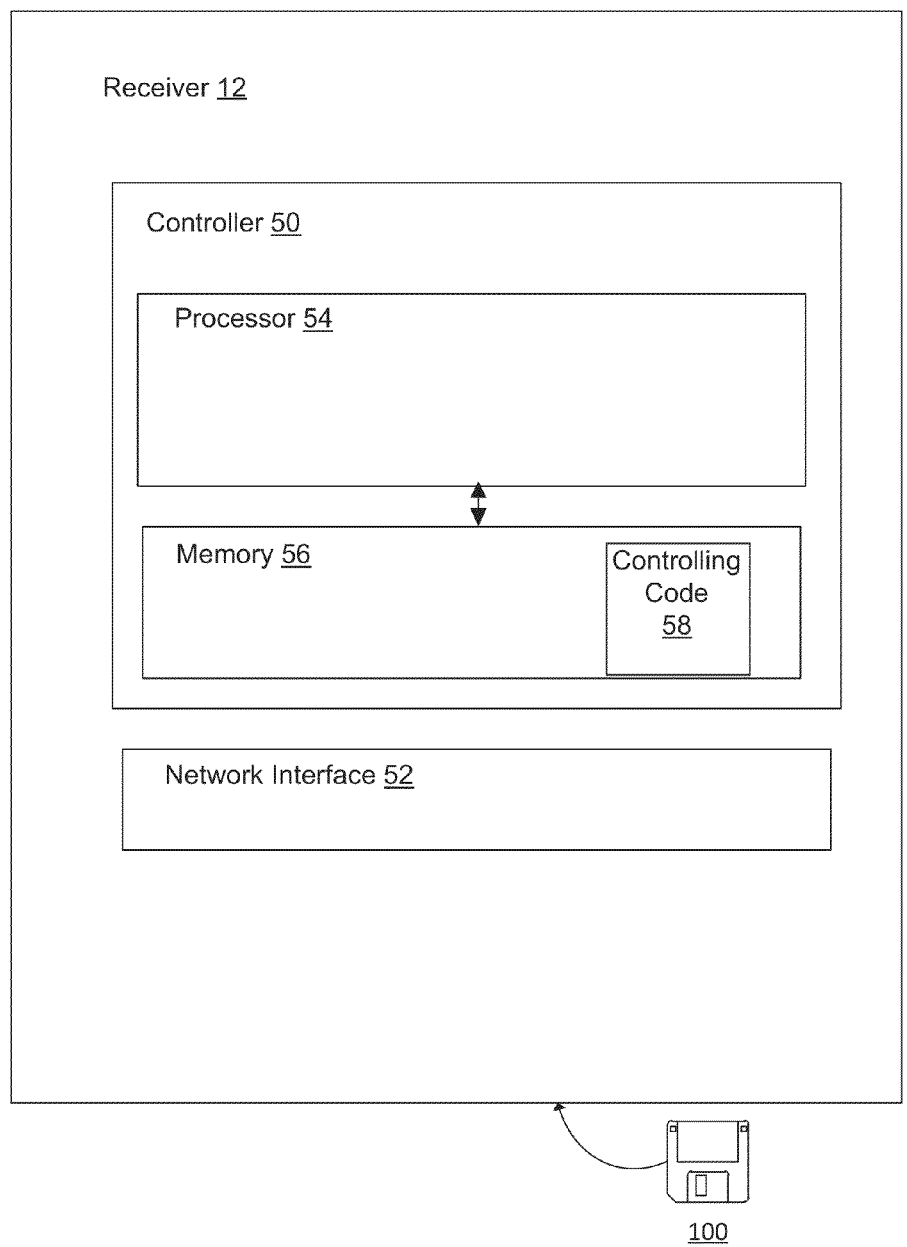
FIG. 2 is a block diagram illustrating an example receiver within the electronic environment shown in FIG. 1.

FIG. 2 illustrates receiver 12. Receiver 12 includes controller 50, which includes processor 54 and memory 56, and network interface 52.

Memory 56 is configured to store controlling code 58 which includes instructions for identifying fraudulent users in a network. Memory 56 generally takes the form of, e.g., random access memory, flash memory or a non-volatile memory.

Processor 54 takes the form of, but is not limited to, Intel or AMD-based MPUs, and can include a single or multi-cores each running single or multiple threads. Processor 54 is coupled to memory 56 and is configured to execute the controlling code 58 stored in memory 56.

Network interface 52 is constructed and arranged to send and receive data over communication medium 18. Specifically, network interface 52 is configured to obtain phishing kit 32 over communications medium 18.

During operation, processor 54 executes instructions in controlling code 58 to obtain phishing kit 32 via network interface 52. Processor 54 then executes instructions in controlling code 58 to extract field names from the PHP files in phishing kit 32 and writes them to memory 56. Processor 54 extracts field names from an identification of a particular format that the PHP script is configured to generate. Further, processor 54 identifies keywords that serve as field names, e.g. "CC#:", "Exp. Date:", and "Security Code #:" for extraction and storage in memory 56.

Processor 54 then arranges the field names in memory 56 into a template file 36 (see FIG. 1). The arrangement of the field names in template file 36 is such that a search operation on email server 22 (see FIG. 1) will uncover emails that were generated using phishing kit 32.

Processor 54 then sends, via network interface 52, template file 36 to email provider 16 (see FIG. 1). Email provider 16, in response, performs a search operation on email server 22 to ascertain the existence of emails having a portion of the body of the email formatted as a template matching that in template file 36.

When email provider 16 finds email 34 on email server 22, email provider 16 extracts content 40 from the header of email and sends content 40 to receiver 12. Receiver 12 receives content 40 via network interface 52 and stores content 40 in memory 56. Upon determining that content 40 is derived from the header body of email 34 generated by phishing kit 32 and used in a phishing attack, processor 54 stores content 40 in database 30. Processor 54 may then be configured to contact authorities to take action against malicious user 26 using content 40 stored in database 30.

Further detail concerning the email that phishing kit 32 is configured to generate are discussed below with respect to FIG. 3.

Figure 3:
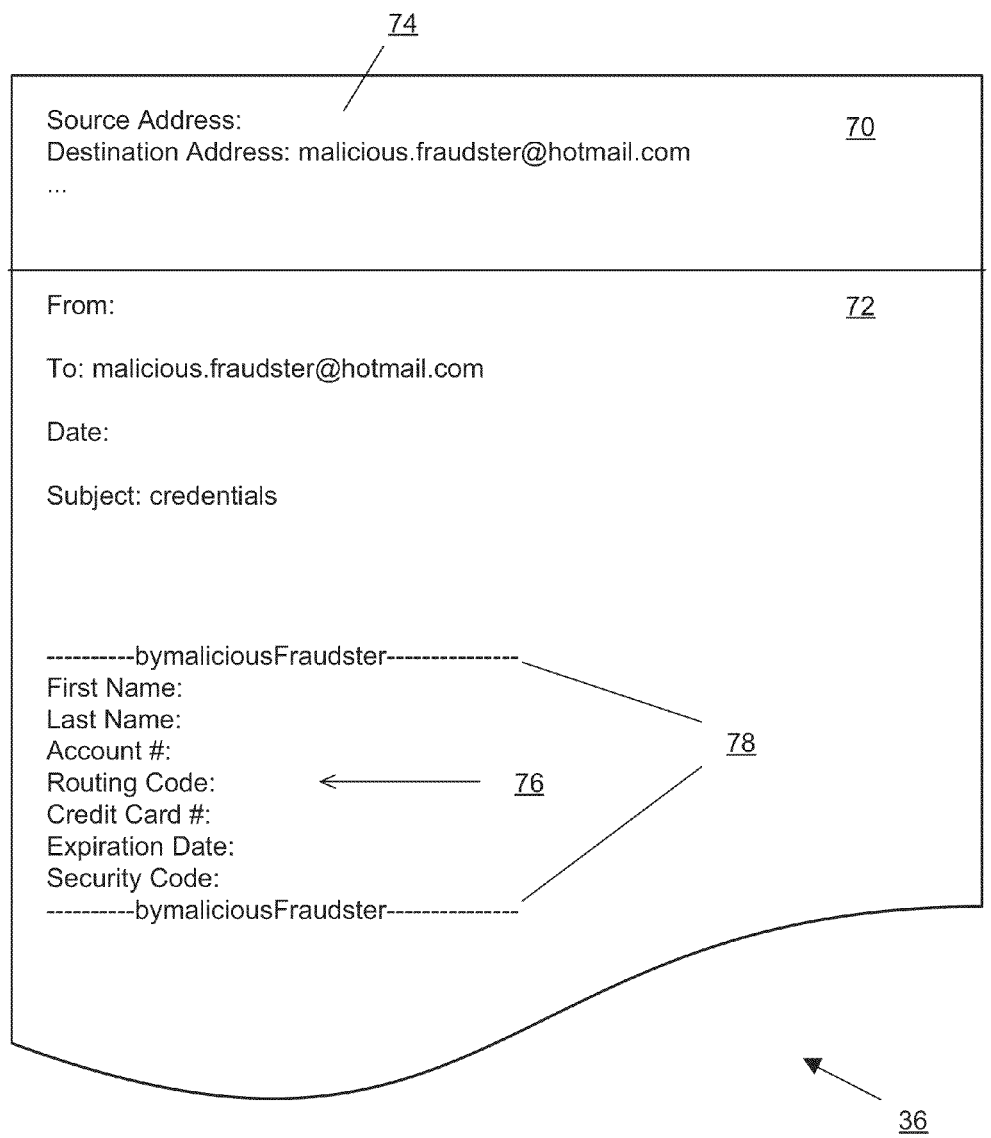
FIG. 3 is a schematic diagram illustrating an example phishing kit template configured to send email from a computer within the electronic environment in FIG. 1.

FIG. 3 illustrates a template 36 of email 34 as generated by phishing kit 32. Email 34 includes a header 70, which includes a source address and a destination address 74, and a body 72.

Body 72 of email 34 is configured to contain sensitive electronic information 18 belonging to customer 16. Body 72 of email 34 includes a formatting area 76 and header and footer 78.

Formatting area 76 is configured to contain the credentials of the phishing victim. Formatting area 76 includes a set of field names. There is space after each field name for a field value that is part of the credentials. For example, the first field name is "First Name:", after which phishing kit 32 is configured to place the first name of the phishing victim.

It is the particular pattern of formatting area 76 that processor 54 reproduces in template file 36. In the example illustrated in FIG. 3, formatting area 76 includes a sequence of keywords such as "First Name:", "Last Name:", "Account #:", etc. Each of these keywords is separated by a carriage return in formatting area 76.

It should be understood that in email 34, as opposed to template 36, there will be field values corresponding to the field names. For example, the phishing victim will have put his first name, last name, account #, routing #, etc., into a form of the spoofed web site, which in turn generates email 34 via PHP scripts in phishing kit 32. A search operation would take such field values into account in determining whether an email contains the sequence of keywords in the particular formatting.

In some arrangements, formatting area 76 includes header and footer 78. Header and footer 78 serve as identifiers of the beginning and end, respectively, of formatting area 76. The search operation performed by email provider 16 would identify a header as a keyword not having a field value appearing after it. That is, header 78 immediately precedes the first field name.

In some arrangements, content 40 includes the field values corresponding to the field names in formatted area 76. Processor 54, upon receiving content 40 via network interface 52, stores the field values in database 30. Further details of the field values in email 34 are discussed below with respect to FIG. 4.

FIG. 4 illustrates an entry in database 30 after processor 54 receives content 40 from email provider 16. In this case, processor 54 placed the field values representing credentials of the phishing victim into database 30. Processor 54 could then notify a service provider (e.g., credit card company) that account information belonging to the phishing victim was compromised. Further, the destination address of the intruder to whom the credentials email was to be sent is recorded in the entry of database 30 for notification of an email provider, as well as for evidence leading to a criminal prosecution.

It should be understood that processor may also send the field names captured from phishing kit 32 to email providers so that they may block such credentials emails from entering a network. In providing the field names to many email providers, there will be a larger chance of preventing theft from phishing attacks and identification of the intruders using phishing kit 32.

Figure 5:
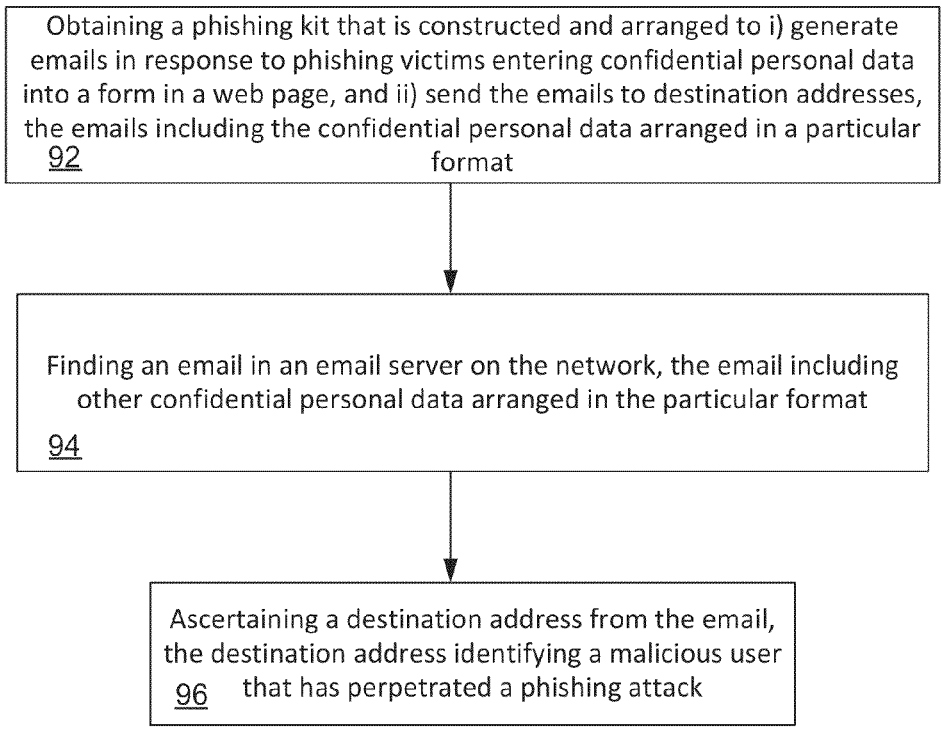
FIG. 5 is a flow chart illustrating a method of carrying out the improved technique within the electronic environment shown in FIG. 1.

FIG. 5 illustrates a method 90 of identifying malicious users that perpetrate phishing attacks on a network. In step 92, a phishing kit that is constructed and arranged to i) generate emails in response to phishing victims entering confidential personal data into a form in a web page, and ii) send the emails to destination addresses, the emails including the confidential personal data arranged in a particular format is obtained. In step 94, an email is found in an email server on the network, the email including other confidential personal data arranged in the particular format. In step 96, a destination address is ascertained from the email, the destination address identifying a malicious user that has perpetrated a phishing attack.

While various embodiments of the invention have been particularly shown and described, it will be understood by those skilled in the art that various changes in form and details may be made therein without departing from the spirit and scope of the invention as defined by the appended claims.

For example, receiver 12 was illustrated as sending template file 36 to email provider 16 for carrying out a search operation on email server 22. In some arrangements, however, receiver 12 carries out the search operation directly on email server 22.

Also, it should be understood that, while the above example phishing kit 32 contained PHP scripts, other scripting languages are possible, e.g., ASP.

Further, it should be understood that, not only should already received and stored emails be searched, but so too should incoming emails before they are stored. Such a scenario would simplify the searching.

Further, it should be understood that not all email providers store emails in a directory format as described above. In some arrangements, email providers store emails in one large file where emails are separated by three blank lines. In other arrangements, email providers store emails in a database.

Furthermore, it should be understood that some embodiments are directed to receiver 12 which is constructed and arranged to identify fraudulent users in a network. Some embodiments are directed to receiver 12. Some embodiments are directed to a system which identifies fraudulent users in a network. Some embodiments are directed to a process of identifying fraudulent users in a network. Also, some embodiments are directed to a computer program product which enables computer logic to identify fraudulent users in a network.

In some arrangements, receiver 12 is implemented by a set of processors or other types of control/processing circuitry running software. In such arrangements, the software instructions can be delivered to receiver 12 in the form of a computer program product 100 (FIG. 2) having a computer readable storage medium which stores the instructions in a non-volatile manner. Alternative examples of suitable computer readable storage media include tangible articles of manufacture and apparatus such as CD-ROM, flash memory, disk memory, tape memory, and the like.

What is claimed is:

1. A method of identifying malicious users that perpetrate phishing attacks on a network, the method comprising:
   obtaining a phishing kit that is constructed and arranged to
      i) generate emails in response to phishing victims entering confidential personal data into a form in a web page, and ii) send the emails to destination addresses, the emails including the confidential personal data arranged in a particular format;
   finding an email in an email server on the network, the email including other confidential personal data arranged in the particular format; and
   ascertaining a destination address from the email, the destination address identifying a malicious user that has perpetrated a phishing attack.

2. A method as in claim 1,
   wherein the particular format includes a set of field names and a set of delimiters;
   wherein finding the email in the email server on the network includes:
      searching for emails stored in the email server that contain the set of field names and the set of delimiters.

3. A method as in claim 2,
   wherein finding the email in the email server on the network further includes:
      sending a message that includes the set of field names and the set of delimiters in a particular sequential order to an email provider, the email provider having access to the email server; and
   wherein ascertaining the destination address from the email includes:
      receiving the destination address from the email provider in response to the message.

4. A method as in claim 3,
   wherein the method further comprises:
      identifying, from the email, a phishing server on the network from which the email was generated.

5. A method as in claim 3,
   wherein the other personal confidential information includes a set of field values, each field value of the set of field values appearing immediately after a field name of the set of field names in the second email;
   wherein the method further comprises:
      storing the set of field values in a storage device.

6. A method as in claim 5,
   wherein the particular format further includes a header;
   wherein finding the email in the email server on the network further includes:
      identifying, as the header, a first field name of the set of field names that immediately precedes a second field name of the set of field names.

7. A method as in claim 5,
   wherein the phishing kit further includes a set of phishing images;

wherein the method further comprises:
  storing each image of the set of phishing images in the storage device.

8. A system constructed and arranged to malicious users that perpetrate phishing attacks on a network, the system comprising:
  a network interface;
  memory; and
  a controller including controlling circuitry coupled to the memory, the controlling circuitry being constructed and arranged to:
    obtain a phishing kit that is constructed and arranged to i) generate emails in response to phishing victims entering confidential personal data into a form in a web page, and ii) send the emails to destination addresses, the emails including the confidential personal data arranged in a particular format;
    find an email in an email server on the network, the email including other confidential personal data arranged in the particular format; and
    ascertain a destination address from the email, the destination address identifying a malicious user that has perpetrated a phishing attack.

9. A system as in claim 8,
  wherein the particular format includes a set of field names and a set of delimiters;
  wherein finding the email in the email server on the network includes:
    searching for emails stored in the email server that contain the set of field names and the set of delimiters.

10. A system as in claim 9,
  wherein finding the email in the email server on the network further includes:
    sending a message that includes the set of field names and the set of delimiters in a particular sequential order to an email provider, the email provider having access to the email server; and
  wherein ascertaining the destination address from the email includes:
    receiving the destination address from the email provider in response to the message.

11. A system as in claim 10,
  wherein the controlling circuitry is further constructed and arranged to:
    identify, from the email, a phishing server on the network from which the email was generated.

12. A system as in claim 10,
  wherein the other personal confidential information includes a set of field values, each field value of the set of field values appearing immediately after a field name of the set of field names in the second email;
  wherein the controlling circuitry is further constructed and arranged to:
    store the set of field values in a storage device.

13. A system as in claim 12,
  wherein the particular format further includes a header;
  wherein finding the email in the email server on the network further includes:
    identifying, as the header, a first field name of the set of field names that immediately precedes a second field name of the set of field names.

14. A system as in claim 12,
  wherein the phishing kit further includes a set of phishing images;
  wherein the controlling circuitry is further constructed and arranged to:
    store each image of the set of phishing images in the storage device.

15. A computer program product having a non-transitory, computer-readable storage medium which stores code to identify fraudulent users in a network, the code including instructions to:
  obtain a phishing kit that is constructed and arranged to i) generate emails in response to phishing victims entering confidential personal data into a form in a web page, and ii) send the emails to destination addresses, the emails including the confidential personal data arranged in a particular format;
  find an email in an email server on the network, the email including other confidential personal data arranged in the particular format; and
  ascertain a destination address from the email, the destination address identifying a malicious user that has perpetrated a phishing attack.

16. A computer program product as in claim 15,
  wherein the particular format includes a set of field names and a set of delimiters;
  wherein finding the email in the email server on the network includes:
    searching for emails stored in the email server that contain the set of field names and the set of delimiters.

17. A computer program product as in claim 16,
  wherein finding the email in the email server on the network further includes:
    sending a message that includes the set of field names and the set of delimiters in a particular sequential order to an email provider, the email provider having access to the email server; and
  wherein ascertaining the destination address from the email includes:
    receiving the destination address from the email provider in response to the message.

18. A computer program product as in claim 17,
  wherein the code includes further instructions to:
    identify, from the email, a phishing server on the network from which the email was generated.

19. A computer program product as in claim 17,
  wherein the other personal confidential information includes a set of field values, each field value of the set of field values appearing immediately after a field name of the set of field names in the second email;
  wherein the code includes further instructions to:
    store the set of field values in a storage device.

20. A computer program product as in claim 19,
  wherein the particular format further includes a header;
  wherein finding the email in the email server on the network further includes:
    identifying, as the header, a first field name of the set of field names that immediately precedes a second field name of the set of field names.

21. A method of identifying malicious users that perpetrate phishing attacks on a network, the method comprising:
  obtaining a phishing kit that is constructed and arranged to i) generate emails in response to phishing victims entering confidential personal data into a form in a web page, and ii) send the emails to destination addresses;
  operating the phishing kit to identify a particular format into which text representing the confidential personal data is arranged in an email; and
  directing an email provider to perform a search operation in an email server on the network for emails that contain text arranged in the particular format in order to ascertain destination addresses identifying malicious users that have perpetrated phishing attacks on the network.

* * * * *